Sept. 26, 1967 C. F. BRODIE 3,343,259
RECIPROCATING CUTTER HEAD WITH FOAM
RUBBER MOUNTING MEANS
Filed June 28, 1965

Inventor:
Charles F. Brodie
by:
Edwin E. Greigg

United States Patent Office 3,343,259
Patented Sept. 26, 1967

3,343,259
RECIPROCATING CUTTER HEAD WITH FOAM RUBBER MOUNTING MEANS
Charles F. Brodie, Zurich, Switzerland, assignor to Tyne Impex Est., Mauren, Liechtenstein
Filed June 28, 1965, Ser. No. 467,287
4 Claims. (Cl. 30—43.92)

ABSTRACT OF THE DISCLOSURE

A dry shaver wherein the reciprocating cutting member is biased against its stationary member by a foam plastic material means. Additional foam material means engage the oscillating driver for the movable cutting member and also partly supports the cutting member. The motion imparted to the latter foam material means by the driver causes it to pulsate the air and thereby create an intermittent vacuum-like effect within the head.

This invention relates to apparatus incorporating a motor driven oscillatory member, such as, for example, electric razors, electric scissors, vibrators, pulsators, mixers, etc.

An object of the invention is to improve the driving action of the driving arm on the movable cutter member by the use of a foam material, such as a foam rubber block, to engage the motor-driven driving arm to be moved thereby. The use of foam rubber cushions the movement of the arm. The foam rubber also absorbs the reversal forces and shocks on the arm and movable cutter member, thereby aiding in the reversal of these parts with a reduction in and insulation of the noise occurring in such reversals.

Another object is the use of a foam rubber block arranged as described above whereby the motion of the driver causes compression and expansion in portions of the foam rubber block resulting in the pulsations of the air within the cutter head.

Still another object is the use of a foam rubber means to support and bias the moving cutter member against its stationary head.

With these and other objects the invention resides in certain improvements and combinations of parts as will be hereinafter more fully described with reference to the accompanying drawing illustrating by way of example an electric razor in which the principles of the present invention are embodied. In the drawing.

Figure 1:
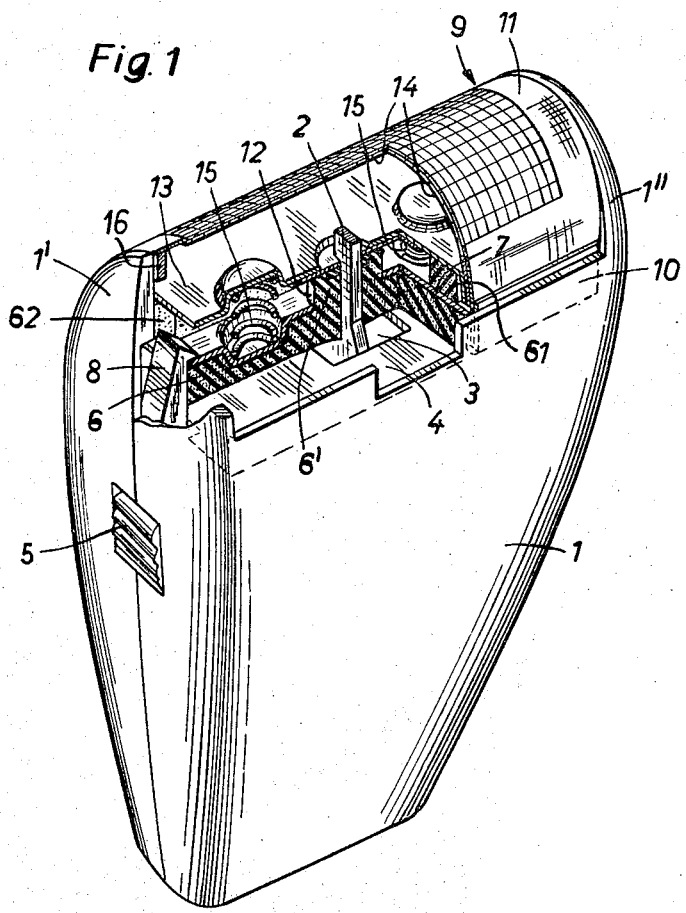
FIGURE 1 represents a perspective view of the razor, partly drawn in section.
Figure 2:
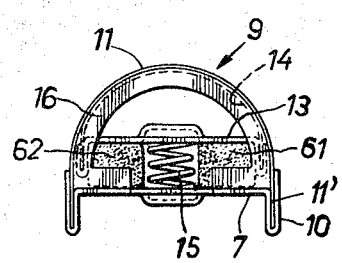
FIGURE 2 is an end view of the shear head shown removed from the casing.

Referring to the drawing, a casing 1, serving in known manner as the handle of the apparatus, contains the driving motor, not depicted, which imparts a reciprocating motion to a driver arm 2. The driver arm extends through a rectangular aperture 3 in a partition wall 4 which supports a body 6 of foam plastics or foamed rubber covering the aperture 3 and filling the whole space between the partition wall 4 and a base plate 7 of a shear head 9 mounted on the casing 1 by means of opposite spring pawls 8 (only one of which being shown). This space is bounded along its longitudinal sides by the folded and flanged marginal portions 10 of the base plate 7 which engage the two longitudinal edge portions 11' of a stationary arch-shaped external cutting member 11, and along its narrow sides by lateral extensions 1' and 1'' of the casing 1. These extensions abut against the semi-annular end flanges 16 of the stationary cutting member 11.

The base plate 7 which is coextensive with the partition wall 4, is provided with a circular aperture 12 through which extends the driver arm 2 closely surrounded by the body of foamed plastics. An annular plug-shaped extension 6' of the plastics body 6 penetrates through the aperture 12 and abuts against a web 13 engaging the end portion of the driver arm 2 without clearance. The web 13 carries the arch-shaped internal reciprocating cutting member 14 which closely fits the shape of the stationary cutting member 11. The reciprocating cutting member 14 is urged by springs 15 inserted between the base plate 7 and the web 13 against the stationary cutting member.

The body 6 of foamed plastics, foamed rubber or any similar resiliently yielding material of cellular structure is accessible after removal of the shear head 9, for purposes of cleaning or replacing. To this end, the pawls 8 are disengaged from their position overlapping the base plate 7 by means of finger actuated levers 5 (only one being shown) and swung outwardly against spring action.

The manner of operation of an electric razor of the described type is well known, so that the following explanations can be limited to the effect of the foam body on the performance of the razor.

As a consequence of the yielding pressure exerted by the foam body 6 on the lower side of the base plate 7 and/or the extension 6' of the foam body on the web 13, the undesired play of the shear head 9 in the casing 1 will be eliminated, and the abutting contact of the reciprocating cutting member 14 against the stationary cutting member is improved. Besides, the extension 6' causes the movement of the driver arm 2 to be transmitted without play to the web 13. By the elimination of the play at this point and between the shear head 9 and the casing a virtually complete noise muffling is obtained. In addition, the foam body 6 acts in the manner of a sound absorbing mass which excludes or efficiently decreases any resonance, particularly of the base plate and of the web 13.

At the same time, the foam body 6 which, owing to its resilience and intimate contact with the driver arm 2 and the web 13, oscillates together with these members, provides a lateral cushioning effect for reciprocating cutting member and driver arm, and by braking the oscillating parts or by accelerating them before and after the reversal of movement, respectively, the reversal is substantially smoothed. The result is not only a virtually noiseless operation, but also an improved cutting action.

Owing to the yieldingly reciprocatory movement of the foam body in itself, particularly by the continuous variation of the volume of air contained in the foam body, a pulsating motion is imparted to the air in the cavity of the shear head, specifically to the air present below the cutting members, this pulsating air producing a vacuum-like effect. The alternating increase and decrease of the pressure in the mentioned cavity produces a corresponding circulation of air through the perforations of the cutting members, this air motion having the effect of a scavenging of the perforations. The hair of the beard will engage with greater security into the perforations and the sliding of the shear head on the skin is facilitated without causing any injury to the skin. The danger of cut hairs getting stuck or jammed at the same time is considerably decreased. When such hairs arrive underneath the web 13 through the lateral gaps or along the driver arm, where it penetrates through the web, a portion of the hairs fall on the foam body which can collect such cut hairs without difficulty, and without the aforementioned effects and advantages being notably impaired.

As seen in the drawing, further bodies of foam rubber or foam plastics 61, and 62 can be inserted in the space between the base plate 7 and the web 13. These additional foam body inserts assist and favor the action of the first mentioned foam body 6. Moreover, it has been observed that the foam bodies 61, 62 which are inserted in prestressed condition impart a uniformly distributed pressure on the web 13 in the direction towards the stationary cutting member. This uniform pressure, acting from the inside towards the outside, provides for an intimate contact of the reciprocating cutting member against the stationary cutting member over the entire surface thereof, irrespective whether the exterior stationary cutting member is slightly flexed or not when the razor is used. Such flexure is quite possible in use, since, in the interest of obtaining a smooth shave, the stationary cutting member is made as thin as possible; this, however, results in an easy deformability of the stationary cutting member. The presence of the additional foam bodies 61, 62, as already mentioned, results in an intimate contact between the movable and the stationary cutting members, so that even with slightly deformed or inwardly bulged shear head, a smooth shave is possible.

The described invention provides a shear head which operates perfectly at all possible conditions of operation, without requiring complicated and expensive structural parts, but rather by making use of the outstanding qualities of foam plastics or foam rubber in a novel manner.

The invention has been shown and described in what is now considered the preferred manner of carrying out the same, but as will be understood, various changes and modifications in the details and arrangements herein described and illustrated may be made by those skilled in the art within the principle and scope of my invention.

I claim:

1. An electric dry shaver comprising a casing, motor actuated oscillatory drive member in said casing, a shear head on said casing, said shear head including a stationary cutting member and a movable cutting member, said movable cutting member having a cutting portion in intimate contact with said stationary member, a transversely extending partition wall in said casing, said partition wall being provided with an aperture for passage of said oscillatory drive member, said shear head having a base plate coextensive with said partition wall at a distance therefrom to form a space between said partition wall and said base plate, a reciprocating web transversely extending above said base plate, said web carrying said movable cutting member and being engaged by said oscillatory drive member, a body of resiliently yielding foam material inserted into said space between the base plate and the partition wall, said body being traversed by said drive member and being in intimate contact with said drive member, said base plate being provided with an aperture and the portion of said foam body surrounding said drive member being provided with a plug-shaped extension integral with said body of foam material and embracing said drive member and penetrating through said aperture in the base plate to abut in prestressed condition against said web carrying the movable cutting member.

2. An electric dry shaver as claimed in claim 1, wherein said extension of the body of foam material is in intimate contact with said oscillatory drive member and penetrates said aperture in the base plate without clearance.

3. An electric dry shaver as claimed in claim 1, comprising additional bodies of foam material inserted between said base plate and said reciprocating web carrying the movable cutting member.

4. An electric dry shaver as claimed in claim 1, comprising spring means inserted between said base plate and said web to yieldably urge the movable cutting member against the stationary cutting member.

References Cited

UNITED STATES PATENTS

| | | | |
|---|---|---|---|
| 2,171,888 | 9/1939 | O'Connor | 30—43.92 |
| 2,203,021 | 6/1940 | Jones | 30—43.92 |
| 2,228,663 | 1/1941 | Knapp | 30—43.92 X |
| 2,232,717 | 2/1941 | Monnet | 30—43.91 |
| 2,337,391 | 12/1943 | Horowitz et al. | 30—43.6 |
| 2,601,720 | 7/1952 | Carissimi | 30—43.92 |
| 2,822,610 | 2/1958 | Kleinman | 30—41.6 |
| 3,079,687 | 3/1963 | Jepson | 30—210 |
| 3,105,298 | 10/1963 | Carissimi | 30—43.92 |
| 3,201,866 | 8/1965 | Parrello | 30—43.92 |
| 3,218,708 | 11/1965 | Spohr | 30—43.92 |

FOREIGN PATENTS 825,518   12/1959   Great Britain.

WILLIAM FELDMAN, *Primary Examiner.*

MYRON C. KRUSE, *Examiner.*